United States Patent [19]

Borgersen

[11] 4,136,577

[45] Jan. 30, 1979

[54] DEVICE FOR CONNECTING EITHER ONE OF TWO ALTERNATIVE OPERATING MEMBERS WITH AN OPERATED MEMBER

[75] Inventor: Kjell I. Borgersen, Hjälteby, Sweden

[73] Assignee: AB Volvo Penta, Gothenburg, Sweden

[21] Appl. No.: 740,652

[22] Filed: Nov. 10, 1976

[51] Int. Cl.² .................................................. G05G 11/00
[52] U.S. Cl. ..................................... 74/479; 192/48.91; 192/67 P
[58] Field of Search ........................ 74/479, 481, 482; 192/48.91, 67 P; 114/146

[56] References Cited

U.S. PATENT DOCUMENTS

| | | | |
|---|---|---|---|
| 2,358,094 | 9/1944 | Panish | 74/479 |
| 3,021,720 | 2/1962 | Schulze et al. | 74/481 |
| 3,128,738 | 4/1964 | Farrington et al. | 114/146 |
| 3,766,794 | 10/1973 | Wilcox | 192/48.91 X |
| 3,842,689 | 10/1974 | Bagge | 74/479 |
| 3,958,524 | 5/1976 | Cantley | 74/479 X |
| 4,019,586 | 4/1977 | Hauser | 192/48.91 |

*Primary Examiner*—Irwin C. Cohen

[57] ABSTRACT

A change-over device for connecting a selected one of two incoming Bowden cables with an outgoing Bowden cable to transmit operating movement has three parallel swing arms individually rotatable about a common axis. The incoming cables are connected with the outer arms and the outgoing cable is connected with the center arm. The center arm is provided with an axially extending coupling pin which can be made to engage, by axial movement of the center arm, a corresponding hole in the arm associated with the selected cable, thereby coupling these two arms for unison movement.

4 Claims, 3 Drawing Figures

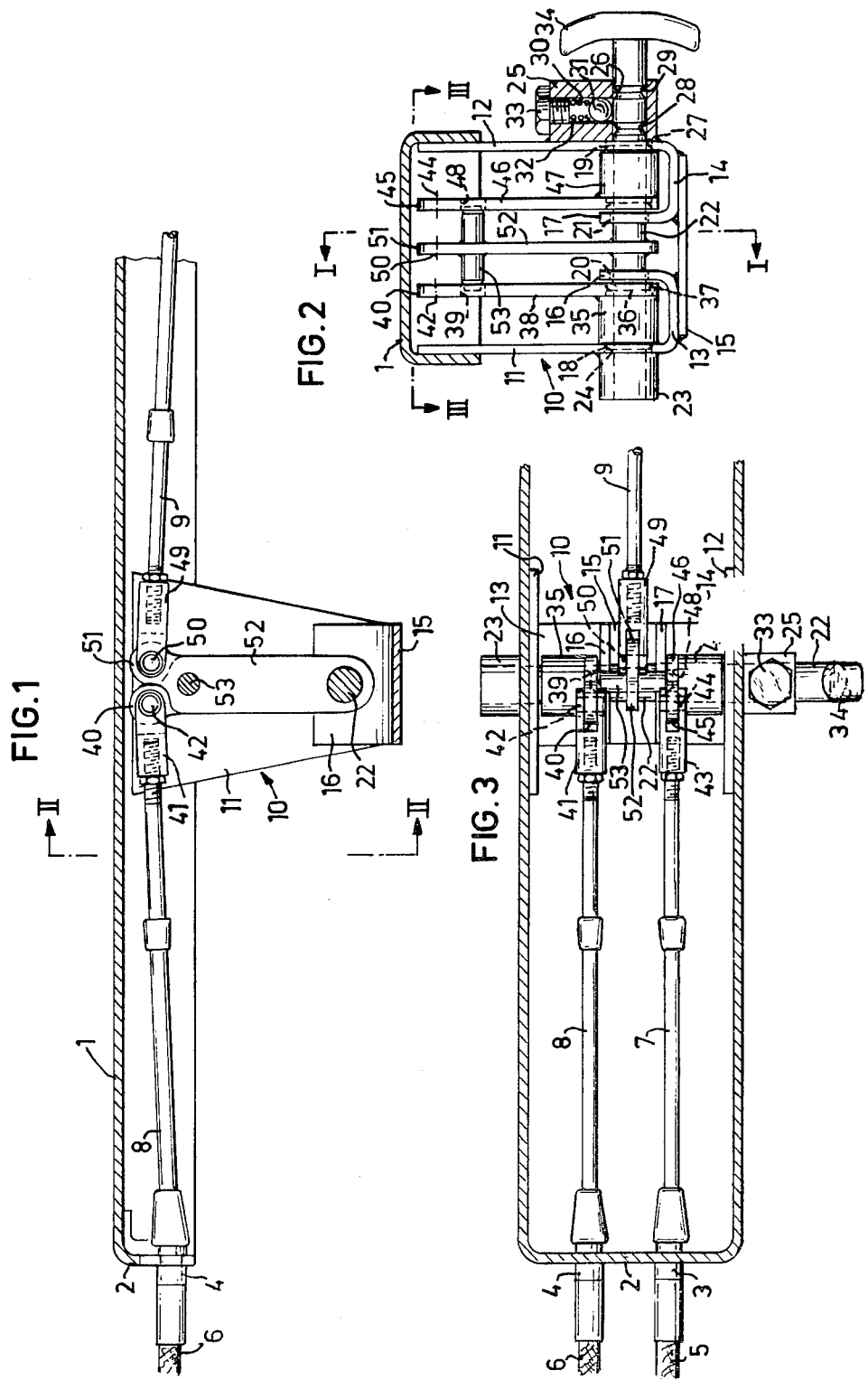

DEVICE FOR CONNECTING EITHER ONE OF TWO ALTERNATIVE OPERATING MEMBERS WITH AN OPERATED MEMBER

The present invention relates to a device for connecting either one of two alternative operating means, each of which comprises an elongated operating member having axial operating movement, to a means intended for operation which likewise has an elongated axially movable operated member, especially to couple either one of two gear shift control cables to an operating cable leading to the gear shift mechanism of a boat motor.

Certain motor boats are provided with two steering locations, and steering as well as control of the motor should be possible as desired from either location. Rigid coupling between the two operating levers for the gear shift mechanism of a motor boat is not desirable, inter alia, because when operating from one steering location, the other operating lever and its transmission mechanism must also be brought into motion and additional frictional forces must be overcome, and this makes the operation difficult and inexact. The purpose of the present invention is, thus, primarily to develop a change-over device for motor boats with double steering locations, by means of which device either one of two operating means is connected to the gear shift mechanism of the motor, while the remaining operating means is taken out of operation. The operating means usually comprise operating levers which are coupled to control wires or Bowden cables. Thus the invention relates primarily to a device for the selective connection of either one of two similar cables with a third cable which leads to the gear shift mechanism. Alternatively, however, other transmission systems are conceivable, for example a rod linkage system.

According to the present invention, this problem is solved by means of one operating member of the two operating means being connected to a first swing arm and the second operating member being connected to a second swing arm, said swing arms being rotatable about a common axis line extending in a transverse direction to the direction of movement of the operating members; that the operated member is connected to a third swing arm which is rotatable about said axis line and situated between the first and second swing arms; that each of the first and second swing arms have coupling means arranged to connect the first and second swing arms to cooperating coupling means of the third swing arm in a non-rotatable manner during coupling movement parallel with said axis line; that the first and second swing arms are immovable in the direction of the axis line while the third swing arm is movable back and forth in the direction of the axis line by means of preferably manually operable moving means so as to be coupled to either one of the first and second swing arms in a predetermined relative rotation position between the third and the first or second swing arm, respectively.

The relative rotation position is suitably chosen so that the arms shall be parallel with each other in the coupling position. This corresponds to the neutral position of the gear shift mechanism and the intention is that change-over between the steering stations shall take place only when the motor is disengaged. When a steering station is to be left, the gear shift mechanism is shifted into the disengaged position, after which the driver moves the third swing arm to its opposite position by means of the moving members, at which position the third swing arm engages with the first or second swing arm which was just disengaged and therewith connects the other steering station to the gear shift mechanism of the motor. The change-over device is arranged next to one of the steering stations, suitably the steering station situated in a lockable steering cabin. The change-over device does not require a large space due to the two operating members leading from the steering stations running parallel with each other, and due to the operated member connected to the gear shift mechanism of the motor being able to be arranged as an extension parallel with the aforementioned two operating members. Thus, the operating device can be advantageously designed as a cable duct having a relatively small, laterally projecting frame part for containing the swing arms and is therefore easy to install.

Suitably, the change-over device is provided with a preferably manually operable rotating means connected to the third swing arm for rotation of the same. Should exact correspondance between the different swing arms not be achieved in the neutral position, it is possible to rotate the third swing arm by means of the rotating means until the correct coupling position has been located and axial movement of the third swing arm is allowed.

Suitably, the movement of the third swing arm is so chosen in relation to the engagement area of the coupling means that the third swing arm is always coupled to at least one of the first and second swing arms. In this manner, one eliminates the risk that the driver, when changing places, shall find that the operating means for the new steering station is not engaged.

An embodiment of the change-over device which, in terms of production technique, is advantageous is characterized in that the first and second swing arms are rotatably and axially movably journalled on a shaft; that the shaft is, in turn, rotatably and axially movably journalled in a frame; that the third swing arm is rigidly connected to the shaft; that the frame has guides which prevent movement of the first and second swing arms in the direction of the shaft; and that the moving and rotating means are connected to the shaft for movement and rotation of the same. The moving and rotating means are suitably designed as a handle on the shaft.

According to a preferred embodiment, the coupling means is formed by a pin attached to the third swing arm, said pin projecting transversely from the swing arm an equal distance on both sides of the same, said pin preferably having conically tapering ends, and a hole in both the first and second swing arms, said holes having the same diameter as the pin and lying at the same distance from the axis line as said pin. These coupling means are simple, inexpensive and reliable and simultaneously eliminate play between ingoing and outgoing operating details.

An embodiment of the invention is described below in more detail with reference to the accompanying drawing in which FIG. 1 is a side view of a change-over device according to the invention as seen in cross-section along line I—I in FIG. 2. FIG. 2 is a cross-section of the change-over device along line II—II in FIG. 1, and FIG. 3 illustrates the change-over device as seen from above in cross-section along line III—III in FIG. 2.

The change-over device according to the embodiment comprises a cable duct in the form of a downwardly open, elongated shallow bowl 1. Two bushings 3,4 for control cables 5,6 are arranged in the left end wall 2 (as seen in the drawing) of the cable duct 1, said control cables leading to individual steering stations onboard a motor boat. The movable parts of the control cables 5,6 extend in the form of elongated operating members 7,8 parallel with the longitudinal direction of the cable duct 1 and inside the same. In a corresponding manner, a further control cable connected to the gear shift mechanism of the boat motor is, in a manner not shown here, drawn through the right end wall of the cable duct 1, the movable part of said control cable extending in the form of an elongated operating member 9 inside the cable duct 1 parallel with the same analogous with operating members 7 and 8.

A frame 10 is attached to the middle of the cable duct, said frame comprising two side plates 11,12 whose upper ends are welded onto the inside of the side walls of the cable duct 1. The bottoms of the side plates 11,12 are bent perpendicular towards each other so as to form two bottom portions 13,14 which are connected to each other by means of a bottom plate 15 welded onto the same. The ends of the side plates 11,12 are thereafter bent upwards so that they, together with plates 11 and 12, form parallel upright tongues 16 and 17 respectively. Mutually aligned bores 18,19,20,21 are arranged in the side plates 11,12 and tongues 16,17, through which bores a shaft 22 extends with play. One end of the shaft is journalled in a bush 23 situated on the outside of the side plate 11, said bush being provided with an extension 24 which extends into the shaft bore 18 and is welded to the same. The opposite end of the shaft 22 is journalled in a locking mechanism housing 25 through which a bore 26 passes in which the shaft 22 is guided, said bore 26 being provided with an annular projection 27 extending into the bore 19 of the side plate 12 and welded to the same.

Inside the bore 26, the shaft 22 is provided with two annular grooves 28,29. A bore 30 in the housing 25 and perpendicular to the shaft 22 contains an axially movable locking ball 31. A pressure spring 32 is clamped between the ball 31 and a screw 33 screwed into the end of the bore 30 and presses the ball 31 into abutment against the shaft 22 so that the ball can cooperate with the annular grooves 28,29 to form two defined axial positions of the shaft 22. The shaft 22 can be moved between these positions by means of a handle 34 attached to the free end of the shaft. The shaft 22 can also be rotated by means of said handle.

A casing 35 whose end facing the tongue 16 has an annular projection 36 having a smaller outer diameter is movably and rotatably journalled on the shaft 22 between the side plate 11 and the tongue 16. The annular projection 36 projects into and is welded to a bore 37 in a swing arm 38 projecting up parallel with the side plate 11. The swing arm 38 is, at substantially the same height as the bottom edge of the cable duct 1, provided with a central transverse hole 39. The upper end of the swing arm 38 is designed as an attachment lug 40 for the axially movable operating member 8 of the control cable 6. The end of the operating member 8 is provided with a fork-like attachment means 41 which is connected to the swing arm 38 by means of a pin 42 which extends between the shanks and the attachment lug 40. Thus, the swing arm 38 can be rotated around the shaft 22 by means of influence from the operating member 8 but is not axially movable in the frame 10 as the side plate 11 and the tongue 16 form axial stops for the bearing casing 35 and the bottom part of the swing arm 38.

In a corresponding manner, the operating member 7 of the control cable 5 is pivotally connected to an attachment lug 45 at the upper end of a swing arm 46 by means of an attachment means 43 and a transverse pin 44. By means of a bearing casing 47, said swing arm 46 is rotatably and axially movably arranged on the shaft 22 on the opposite side in the frame 10 analogous with the swing arm 38. The swing arm 46 also has a transverse hole 48 situated at the same height as the bottom edge of the cable duct 1, said hole having the same diameter as and being aligned with the hole 39 in the swing arm 38 when both swing arms 38 and 46 assume a parallel rotation position.

The operating member 9 of the control cable leading to the gear shift mechanism of the motor is likewise in a corresponding manner provided with a fork-shaped attachment means 49 which, by means of a transverse pin 50, is pivotably connected to an attachment lug 51 at the end of a third swing arm 52. The swing arm 52 is designed in the same manner as the swing arms 38 and 46, but is welded onto the shaft 22 centrally between the tongues 16 and 17 when the shaft 22 assumes the position shown in FIG. 2, in which position the annular grooves 28 and 29 lie symmetrically on respective sides of the locking ball 31. The third swing arm 52 is provided with a transverse pin 53 having conically bevelled ends and the same diameter as the holes 39 and 48, said pin 53 being arranged at the same radial distance from the shaft 22 as the holes 39 and 48 are situated in the swing arms 38 and 46. The axial length of the pin 53 is somewhat greater than the distance between the swing arms 38 and 46. By means of moving the shaft 22 in its axial direction, the pin 53 can be pushed into one of holes 39 or 48, whereby the swing arm 52 is non-rotatably coupled to the swing arm 38 or 46.

The device functions in the following manner. If the shaft 22 is pushed into the frame 10 so that the locking ball 31 cooperates with the annular groove 29, the pin 53 of the third swing arm 52 extends into the hole 39 of the swing arm 38, whereby the swing arms 38 and 52 are coupled together. Operating movement of the operating lever connected to the control cable 6 is transferred from its operating member 8 to the swing arm 38 and via the coupling pin 22 to swing arm 52 which, in turn, is connected to the operating member 9 which transmits the operating movement to the gear shift mechanism of the boat motor. In the figures, the swing arms are shown standing in the upright position. This corresponds to the neutral position of the gear shift. From this position, the swing arm can be swung in both directions for shifting to forward and rear gears. When the driver wishes to switch steering stations, he shifts the operating member to the neutral position, after which the shaft 22 is pulled out of the frame 10 by means of the handle 34 until the ball 31 cooperates with the groove 28. The pin 53 of the third swing arm 52 has herewith been withdrawn from the hole 39 of the first swing arm 38 so that said swing arm and accompanying control cable 6 are released. Simultaneously, the pin 53 is inserted into the hole 48 of the second swing arm 46, whereby the control cable 5 belonging to said swing arm is connected to the operating member 9 influencing the gear shift mechanism. After a previous coupling procedure, the second swing arm 46 has been left in the neutral position, whereby its hole 48 shall be aligned with the pin 53. Small deviations in the mutual neutral positions of the swing arms do not prevent coupling by means of the coupling pin 53 as the ends of said pin are conically bevelled and are thus able to center the pin 53 in the holes. If a greater deviation should arise, the driver can simultaneously as he pushes or pulls the handle 34 turn the same, whereby the third swing arm 52 is swung in relation to the swing arm with which coupling is to take place. When the pin 53 has in this manner been swung to a position in front of the coupling hole, axial movement for the coupling with the new swing arm is allowed.

What I claim is:

1. A device for connecting either one of two alternative operating means (5,6), each of which comprises an elongated operating member (7,8) having axial operating movement, to a means intended for operation which also has an elongated, axially movable operated member (9), the operating members (7,8) of the two operating means being each connected to an individual first (38) and second (46) swing arm, said swing arms being rotatable about a common axis line (22) extending in a transverse direction to the direction of movement of the operating members; the operated member (9) being connected to a third swing arm (52) which is rotatable about said axis line (22) and situated between the first and second swing arms (38,46); each of the first and second swing arms (38,46) having coupling means (39,48) arranged to connect the first and second swing arms (38,46) to cooperating coupling means (53) of the third swing arm (52) in a non-rotatable manner during coupling movement parallel with said axis line (22); the first and second swing arms (38,46) being immovable in the direction of the axis line (22) while the third swing arm (52) is movable back and forth in the direction of the axis line by means of manually operable moving means (34) so as to be coupled to either one of the first and second swing arms (38,46) in a predetermined relative rotation position between the third (52) and the first (38) or second (46) swing arm, respectively, manually operable rotating means (34) connected to the third swing arm (52) for rotation of the same, the first and second swing arms (38,46) being rotatably and axially movably journalled on a shaft (22); the shaft (22) being, in turn, rotatably and axially movably journalled in a frame (10); the third swing arm (52) being rigidly connected to the shaft (22); the frame (10) having guides (11, 16,17,12) which prevent movement of the first and second swing arms (38,46) in the direction of the shaft (22); and the moving and rotating means (34) being connected to the shaft (22) for axial movement and rotation of the same.

2. Device according to claim 1, characterized in that the moving and rotating means are formed by a handle (34) arranged on the shaft (22).

3. Device according to claim 1, characterized in that the coupling means is formed by a pin (53) attached to the third swing arm (52), said pin extending transversely of the swing arm an equal distance on both sides of the same, said pin preferably having conically tapering ends, and a hole (39,48) in both the first and second swing arms (38,46), said holes having the same diameter as the pin (53) and lying at the same distance from the axis line (22) as said pin.

4. Device according to claim 1, characterized by a positioning mechanism (28,29,31) which provides the shaft (22) with two definite axial positions corresponding to the coupling position of the third swing arm (52) with the first (38) and second (46) swing arm, respectively.

* * * * *